US012802532B2

(12) United States Patent
Lam et al.

(10) Patent No.: US 12,802,532 B2
(45) Date of Patent: Nov. 17, 2026

(54) ARTIFICIAL INTELLIGENCE-ENABLING KIT FOR SELF-CHECKOUT EQUIPMENT

(71) Applicant: FLYTECH TECHNOLOGY CO., LTD., Taipei City (TW)

(72) Inventors: Tai-Seng Lam, Taipei City (TW); Li-Chun Chou, Taipei City (TW); Shui-Chin Tsai, Taipei City (TW)

(73) Assignee: FLYTECH TECHNOLOGY CO., LTD., Taipei City (TW)

( * ) Notice: Subject to any disclaimer, the term of this patent is extended or adjusted under 35 U.S.C. 154(b) by 0 days.

(21) Appl. No.: 19/023,963

(22) Filed: Jan. 16, 2025

(65) Prior Publication Data

US 2026/0188087 A1 Jul. 2, 2026

(51) Int. Cl.
*G07G 1/00* (2006.01)

(52) U.S. Cl.
CPC .................................. *G07G 1/0009* (2013.01)

(58) Field of Classification Search
CPC ... G07G 1/0009; G07G 1/0035; G07G 1/0046
USPC .......................................................... 235/383
See application file for complete search history.

(56) References Cited

U.S. PATENT DOCUMENTS

| | | | | |
|---|---|---|---|---|
| 12,380,771 | B1 * | 8/2025 | Lam | G07G 1/0036 |
| 2023/0368625 | A1 * | 11/2023 | Sanil | G06V 20/52 |
| 2024/0029441 | A1 * | 1/2024 | Jeon | G06V 20/52 |
| 2025/0078058 | A1 * | 3/2025 | Maksymenko | G06Q 20/208 |
| 2025/0305869 | A1 * | 10/2025 | Nack | G01G 23/16 |
| 2026/0017634 | A1 * | 1/2026 | Thomas | G06Q 20/18 |

* cited by examiner

*Primary Examiner* — Ahshik Kim
(74) *Attorney, Agent, or Firm* — Demian K. Jackson; Jackson IPG PLLC

(57) ABSTRACT

The present invention relates to an artificial intelligence-enabling kit. The k includes: a separable artificial intelligence-enabling box module including a first microcontroller and configured to be connected with the self-checkout equipment; a checkout-end computer program product selectively configured on the self-checkout equipment; and an enabling-end computer program product selectively configured on the separable artificial intelligence-enabling box module and configured to control the first microcontroller to perform a peripheral device emulation.

9 Claims, 6 Drawing Sheets

ARTIFICIAL INTELLIGENCE-ENABLING KIT FOR SELF-CHECKOUT EQUIPMENT

CROSS-REFERENCE TO RELATED APPLICATION

This application claims priority benefit to Taiwan Invention Patent Application Serial No. 113151784, filed on Dec. 31, 2024, in Taiwan Intellectual Property Office, the entire disclosures of which are incorporated by reference herein.

FIELD

The present invention relates to an artificial intelligence-enabling kit for self-checkout equipment, in particular an artificial intelligence-enabling kit that introduces artificial intelligence functionalities to a conventional self-checkout equipment without modifying the hardware or software configurations thereof.

BACKGROUND

After the COVID-19 pandemic, labor shortages have made self-checkout (SCO) a popular technology. However, with the rapid growth in demand for self-service, traditional SCO machines have shown deficiencies in anti-fraud and anti-counterfeit capabilities. Nevertheless, with the rapid development of AI hardware and software in recent years, significant progress has been made in fraud and misscan detection.

Currently, traditional SCO machines often lack these AI anti-fraud and anti-misscan capabilities due to their earlier design and lack the processing power to run AI algorithms. Integrating AI solutions into existing SCO machines presents numerous challenges at both the hardware and software levels.

For example, peripheral devices in existing SCO systems, such as cameras, barcode scanners, card readers, and printers, are mostly directly connected to the original SCO machines and are controlled and exchange data based on protocols and command sets such as OPOS (OLE for Retail POS), JPOS (Java for Retail POS), and Command Set. These peripherals must strictly adhere to the interface and data structure design of the original system, and the systems are relatively closed. Introducing AI functionality requires significant changes to the communication logic or data flow design between the peripherals and the main system. In addition, integrating new AI systems with the original SCO systems requires extensive testing and debugging to ensure overall system stability and security.

Furthermore, since SCO equipment was developed earlier, its hardware architecture and software design were often created by different suppliers, resulting in inconsistent interface standards across systems. Therefore, the integration of different interfaces is a significant challenge. In addition, existing SCO hardware and software designs do not inherently support AI solutions.

Thus, in order to integrate AI recognition technology seamlessly, businesses typically require to make significant modifications to existing software systems, such as redesigning or updating current applications and control logic, to ensure smooth communication and operation between the AI system and peripheral devices. These modifications require significant investments of manpower, time, and financial resources, and may result in system instability or changes to operational workflows, further increasing barriers to technology adoption.

In addition, as SCO systems involve financial transactions and privacy considerations, in order to ensure privacy, system security, and transaction security, many businesses are unwilling to open the data interfaces of their existing applications for modification or accept hardware and software modifications, which further complicates the introduction and deployment of AI solutions for traditional SCO systems.

Nevertheless, with the rapid advancement of AI technology, including improvements in the computing power of AI chips and the emergence of various AI models, many retailers, wholesalers, merchants and independent software vendors (ISVs) are quite eager to upgrade traditional SCO systems up to AI-SCO systems, so as to use functionalities such as misscan detection, fraud prevention, and product recognition, which are capable of improving the reliability of SCO systems.

Hence, there is a need to solve the above deficiencies/issues. In view of the deficiencies existing in the prior art, the inventors, through dedicated efforts and research, have conceived the present invention, "Artificial Intelligence-Enabling Kit for Self-Checkout Equipment," which addresses the aforementioned above deficiencies. A brief description of the invention is provided below.

SUMMARY

The present invention relates to an artificial intelligence-enabling kit for self-checkout equipment, in particular an artificial intelligence-enabling kit that introduces artificial intelligence functionalities to a conventional self-checkout equipment without modifying the hardware or software configurations thereof.

Accordingly, the present invention provides an artificial intelligence-enabling kit, attached to a self-checkout equipment. The kit includes: a separable artificial intelligence-enabling box module including a first microcontroller and configured to be connected with the self-checkout equipment; a checkout-end computer program product selectively configured on the self-checkout equipment; and an enabling-end computer program product selectively configured on the separable artificial intelligence-enabling box module and configured to control the first microcontroller to perform a peripheral device emulation.

The above content described in the summary is intended to provide a simplified summary for the presently disclosed invention, so that readers are able to have an initial and basic understanding to the presently disclosed invention. The above content is not aimed to reveal or disclose a comprehensive and detailed description for the present invention, and is never intended to indicate essential elements in various embodiments in the present invention, or define the scope or coverage in the present invention.

DESCRIPTION OF THE DRAWINGS

A more complete appreciation according to the present invention and many of the attendant advantages thereof are readily obtained as the same become better understood by reference to the following detailed description when considered in connection with the accompanying drawing, wherein.

DETAILED DESCRIPTION

Figure 1:
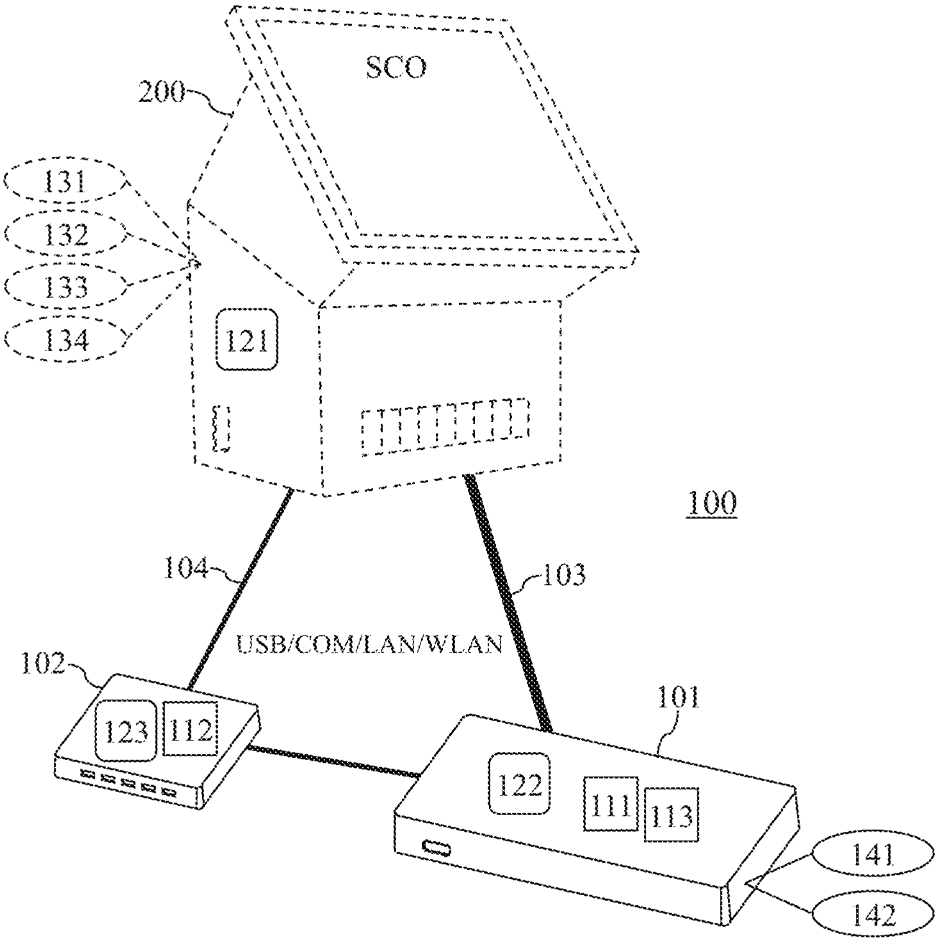
FIG. 1 is a schematic diagram illustrating the system architecture for the artificial intelligence-enabling kit for self-checkout equipment included in the present invention.

The present disclosure will be described with respect to particular embodiments and with reference to certain drawings, but the disclosure is not limited thereto but is only limited by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice. It is clear that other embodiments can be configured according to the knowledge of persons skilled in the art without departing from the true technical teaching of the present disclosure, the claimed disclosure being limited only by the terms of the appended claims.

It is to be noticed that the term "including," used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device including means A and B" should not be limited to devices consisting only of components A and B.

The present invention is directed to providing an artificial intelligence (AI) upgrade solution for self-checkout (SCO) equipment lacking AI capabilities, and is capable of acquiring the data required to implement AI functionalities without modifying the original hardware and software architecture of the existing SCO system. By integrating an external AI box into the existing SCO equipment, the present invention introduces multiple AI functionalities into the existing SCO systems, and offers a simple and efficient AI upgrade scheme that significantly enhances the performance of the existing SCO systems.

The present invention provides a comprehensive system architecture for a separable AI-enabling system applied to a SCO equipment, and uses a fundamental architecture where the "AI-enabling system" is separated from the "original SCO system", which constructs an external AI module that connects to the existing SCO machines. The external AI module is capable of integrating powerful AI functionalities into the existing SCO equipment without modifying the existing hardware configuration, operating system, or applications (Apps) running on the SCO machines, nor requiring any code changes or redesign of SCO peripherals. The present invention not only reduces the complexity of implementing AI functionalities for the existing SCO equipment, but also provides different solutions in response to various business entities with different requirements for AI application in different depth and scope.

The present invention offers a suite of integrated AI solutions that do not require the modification of the hardware and software configurations for the original SCO system and is capable of being rapidly introduced, which the respective solutions provide for different users, including but not limited to retailers, wholesalers, independent software vendors (ISVs), system integrators, and AI service providers, etc., with different demands, to seamlessly and quickly add and deploy different levels of AI systems to the original SCO system with minimal risk and cost for integration and development.

FIG. 1 is a schematic diagram illustrating the system architecture for the artificial intelligence-enabling kit for self-checkout equipment included in the present invention. The artificial intelligence-enabling kit 100 includes a separable artificial intelligence-enabling box module 101, a data acquisition module 102, a checkout-end computer program product 121, an enabling-end computer program product 122, and an acquisition-end computer program product 123. The separable artificial intelligence-enabling box module 101 is preferably configured with a processor 113 and a first microcontroller (MCU) 111, wherein the processor 113 is configured to execute various artificial intelligence algorithms, and the data acquisition module 102 is preferably configured with a second microcontroller 112.

The self-checkout equipment 200 preferably further includes multiple SCO peripheral devices such as a scanner 131, a printer 132, a card reader 133, and a magnetic stripe reader 134. The artificial intelligence-enabling box module 101 preferably further includes multiple AI peripheral devices such as an image sensor 141 and a motion sensor 142.

In one embodiment, the separable artificial intelligence-enabling box module 101 is preferably connected to the self-checkout equipment 200 through a first transmission path 103. In one embodiment, the separable artificial intelligence-enabling box module 101 is preferably connected to the self-checkout equipment 200 through a second transmission path 104 that includes the data acquisition module 102. The first transmission path 103 and the second transmission path 104 preferably include various communication interfaces, such as USB or serial communication interfaces, networks, e.g., wired or wireless networks, the Internet, telecommunication networks, or combinations thereof.

The checkout-end computer program product 121 is preferably configured to execute on the self-checkout equipment 200, the enabling-end computer program product 122 is preferably configured to execute on the separable artificial intelligence-enabling box module 101, and the acquisition-end computer program product 123 is preferably configured to execute on the data acquisition module 102. The complete artificial intelligence-enabling kit 100 for self-checkout equipment is preferably attached to a self-checkout equipment 200 that lacks AI capabilities to operate.

Figure 2:
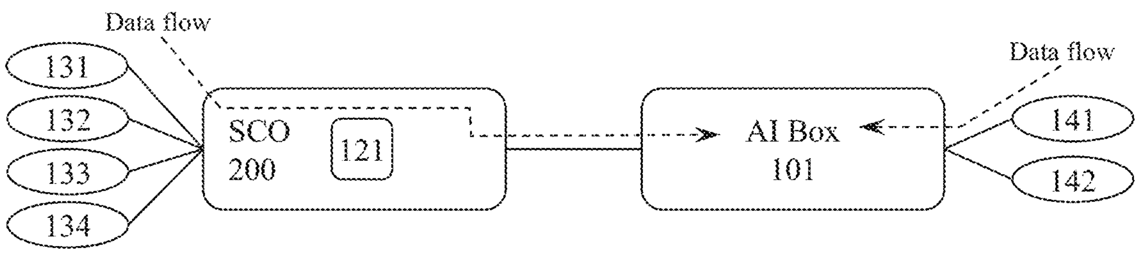
FIG. 2 is a schematic diagram illustrating the first embodiment included in the present invention.

FIG. 2 is a schematic diagram illustrating the first embodiment included in the present invention. In the first embodiment, depending on different hardware and software conditions or authorization scopes from the client, the actual conditions offering for configurations may be as follows: it is acceptable to connect the SCO equipment directly to the AI box and to install external software on the SCO equipment, but the SCO peripheral devices are required to connect to the SCO equipment.

In the first embodiment, the artificial intelligence-enabling kit 100 for self-checkout equipment is selected to include the separable artificial intelligence-enabling box module 101 and the checkout-end computer program product 121. The separable artificial intelligence-enabling box module 101 is configured to connect multiple AI peripheral devices, including but not limited to an image sensor 141 and a motion sensor 142. The self-checkout equipment 200 is configured to connect multiple SCO peripheral devices, including but not limited to a scanner 131, a printer 132, a card reader 133, and a magnetic stripe reader 134. The checkout-end computer program product 121 has a core task to intercept and capture data flows and is configured to be installed on the self-checkout equipment 200 to execute as an application software.

Preferably, the checkout-end computer program product 121 is configured to modify installation configuration files, such as INF files, for SCO peripheral device drivers in the self-checkout equipment 200 or to modify system settings to insert a filter driver into a specified position in a communication interface driver stack, to monitor and intercept all data passing through the communication interface, to filter data sourced from the SCO peripheral devices, and to transmit the intercepted raw data to the separable artificial intelligence-enabling box module 101 for subsequent AI analysis, detection, interpretation, and recognition, including, but are not limited to, misscan detection, fraud prevention, product recognition, abnormal item detection, transaction information comparison, and consumer image data analysis.

Figure 3:
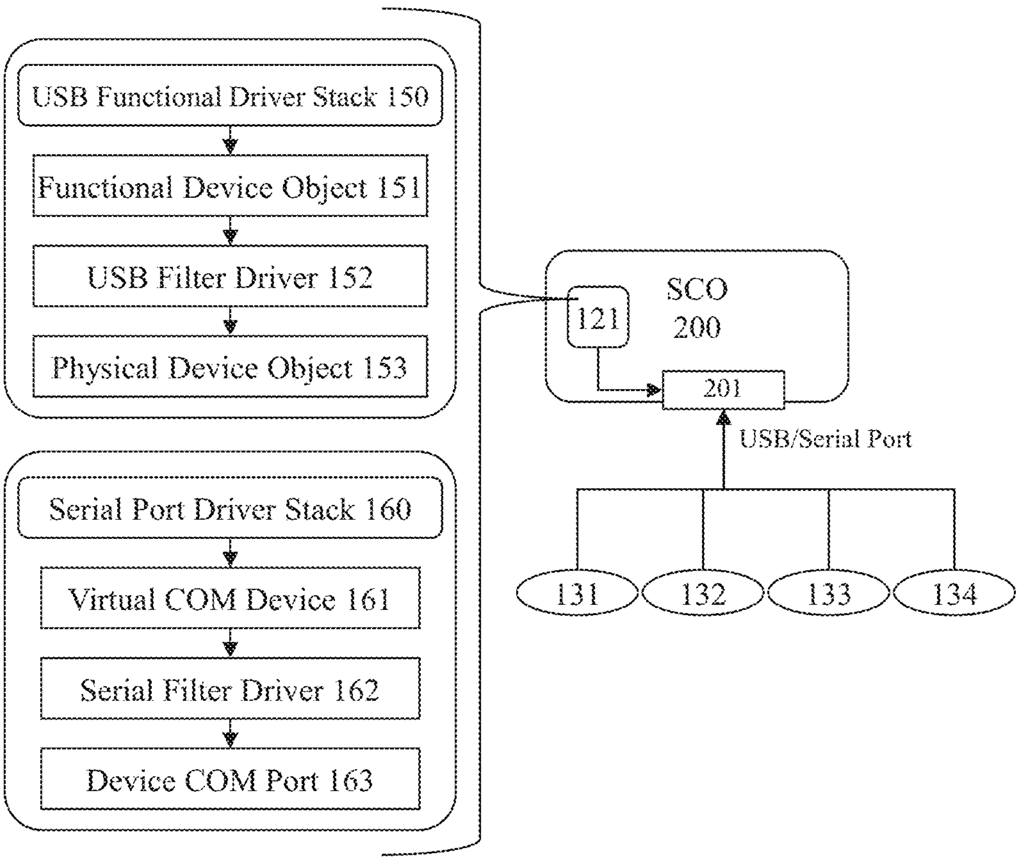
FIG. 3 is a schematic diagram illustrating the principles of operation for the checkout-end computer program product included in the present invention.

FIG. 3 is a schematic diagram illustrating the principles of operation for the checkout-end computer program product included in the present invention. In one embodiment, SCO peripheral devices such as a scanner 131, a printer 132, a card reader 133, and a magnetic stripe reader 134 are preferably connected to the self-checkout equipment 200 via communication interfaces 201, such as USB or serial interfaces. Using a USB communication interface as an example, the checkout-end computer program product 121 is configured to place a USB filter driver 152 between the functional device object (FDO) 151 and the physical device object (PDO) 153, forming a USB functional driver stack 150, to monitor and intercept all data passing through the USB communication interface and to filter data sourced from the SCO peripheral devices.

Using a serial communication interface as an example, the checkout-end computer program product 121 is configured to place a serial filter driver 162 between a virtual COM device 161 and a device COM port 163, forming a serial port driver stack 160, to monitor and intercept all data passing through the serial communication interface and to filter data sourced from the SCO peripheral devices.

Figure 4:
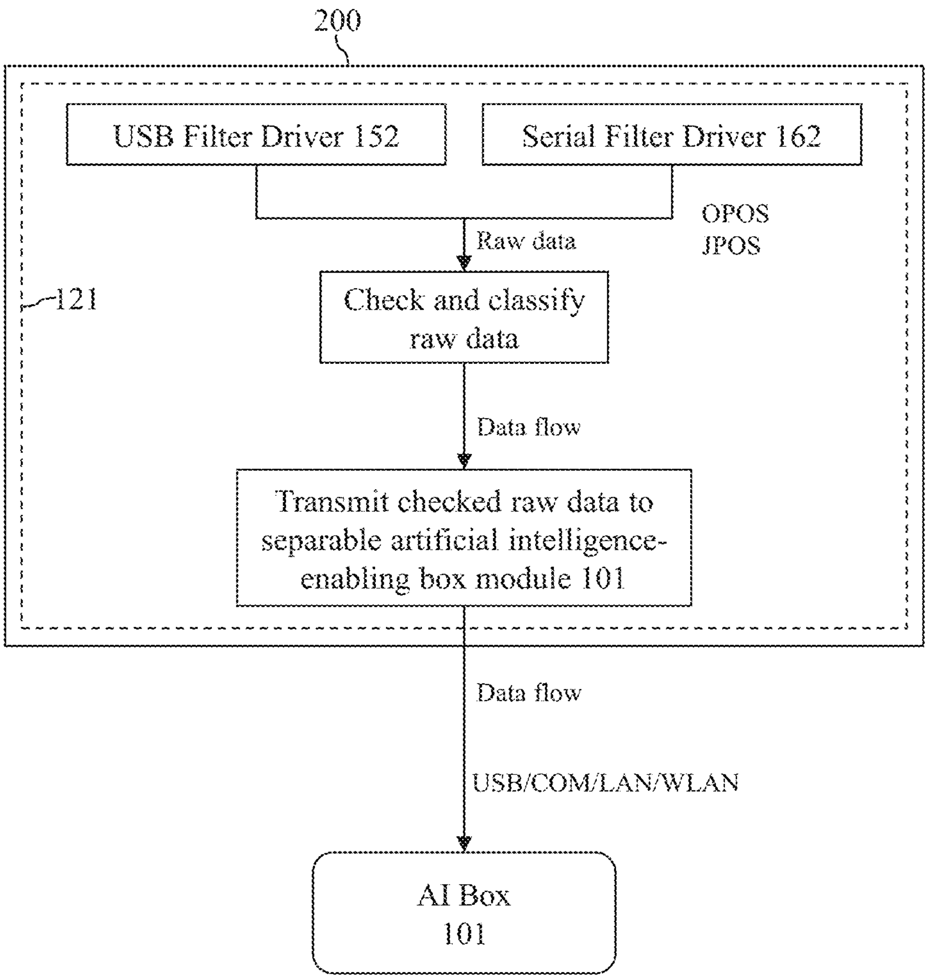
FIG. 4 is a schematic diagram illustrating the data flow in the first embodiment included in the present invention.

FIG. 4 is a schematic diagram illustrating the data flow in the first embodiment included in the present invention. After receiving raw data intercepted by the filter drivers, including but not limited to the USB filter driver 152 and the serial filter driver 162, the checkout-end computer program product 121 is configured to check and classify the raw data. After the raw data is successfully checked and classified, the processed raw data is transmitted to the separable artificial intelligence-enabling box module 101. In one embodiment, the checkout-end computer program product 121 is preferably configured to support intercepting and processing instruction sets and data flows based on, for example, but not limited to, OPOS and JPOS standards.

After successfully receiving the raw data obtained from the SCO peripheral devices, the separable artificial intelligence-enabling box module 101 is configured to perform subsequent AI analysis, detection, interpretation, and recognition based on the raw data obtained from the SCO peripheral devices and the image data and detection data obtained from the image sensor 141 and the motion sensor 142.

In this embodiment, since the filter driver is selectively placed between the functional objects in the software layer and the physical objects in the hardware layer of the self-checkout equipment 200, the data flow obtained from the SCO peripheral devices is intercepted before it reaches the operating system or applications. Thus, during the data acquisition process, the self-checkout equipment 200 does not recognize or need to recognize the existence of the separable artificial intelligence-enabling box module 101. The self-checkout equipment 200 detects and recognizes that there are no changes to its hardware and software configurations. Hence, the separable artificial intelligence-enabling box module 101 is still able to capture all data flows sourced from the SCO peripheral devices for subsequent AI interpretation without modifying the existing software workflow, source code, or hardware configuration of the self-checkout equipment 200.

In this embodiment, for the client end, the client is only required to simply install the checkout-end computer program product 121 on the self-checkout equipment 200 and connect the self-checkout equipment 200 to the separable artificial intelligence-enabling box module 101. With minimal changes, the self-checkout equipment 200 is successfully upgraded in-situ to add AI functionalities, to empower AI capabilities for the original SCO system, without changing either the existing checkout workflow or the original normal operation of the original SCO system.

Figure 5:
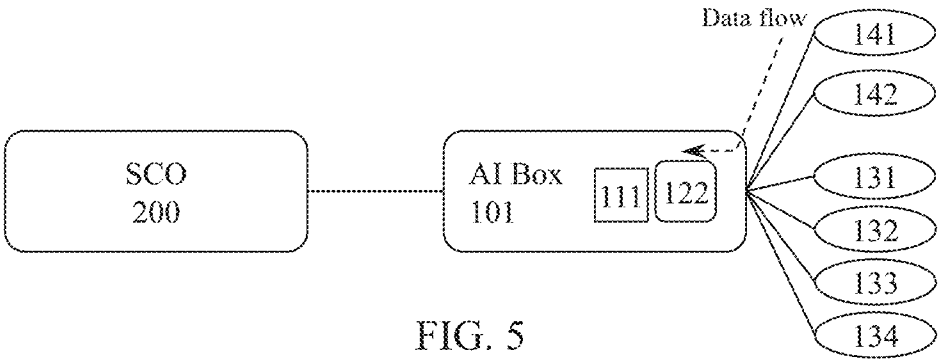
FIG. 5 is a block diagram illustrating the second embodiment included in the present invention.

FIG. 5 is a block diagram illustrating the second embodiment included in the present invention. In the second embodiment, depending on different hardware and software conditions or authorization scopes from the client, the actual conditions offering for configurations may be as follows: it is acceptable to connect the SCO equipment directly to the AI box and to have all SCO peripheral devices connected to the AI box, but it is unacceptable to install any external software in the SCO equipment.

In the second embodiment, the artificial intelligence-enabling kit 100 for self-checkout equipment is selected to include the separable artificial intelligence-enabling box module 101 and the enabling-end computer program product 122. The separable artificial intelligence-enabling box module 101 includes a first microcontroller 111 and is configured to connect both all SCO peripheral devices and AI peripheral devices, such as a scanner 131, a printer 132, a card reader 133, a magnetic stripe reader 134, an image sensor 141, and a motion sensor 142. The first microcontroller 111 is configured to perform a peripheral device emulation.

The enabling-end computer program product 122 has core tasks, including performing the bidirectional communication relay and the peripheral device emulation. The enabling-end computer program product 122 is preferably configured to operate in a form of firmware that is integrated into the separable artificial intelligence-enabling box module 101 to control the first microcontroller 111 to perform the peripheral device emulation.

In this embodiment, since the SCO peripheral devices that originally connected to the self-checkout equipment 200 are rearranged to be connected to the separable artificial intelligence-enabling box module 101, the separable artificial intelligence-enabling box module 101 is required to perform the peripheral device emulation, to render the self-checkout equipment 200 perceive that there are no changes to its hardware and software configurations, to achieve the technical effect of capturing data flow and enabling AI functionalities for the SCO equipment without modifying its hardware and software.

In one embodiment, the peripheral device emulation includes an initialization process and a runtime process. The initialization process realizes the peripheral device emulation by triggering a hot-plug event on the separable artificial intelligence-enabling box module 101, to rendering the self-checkout equipment 200 to trigger to activate a device enumeration service correspondingly. The runtime process realizes the bidirectional data relay by forming a data flow loop between the separable artificial intelligence-enabling box module 101 and the self-checkout equipment 200.

In one embodiment, the separable artificial intelligence-enabling box module 101 is preferably configured to provide a USB communication interface and a serial communication interface for peripheral devices to connect, and also to provide a USB communication interface for connecting the self-checkout equipment 200.

Figure 6:
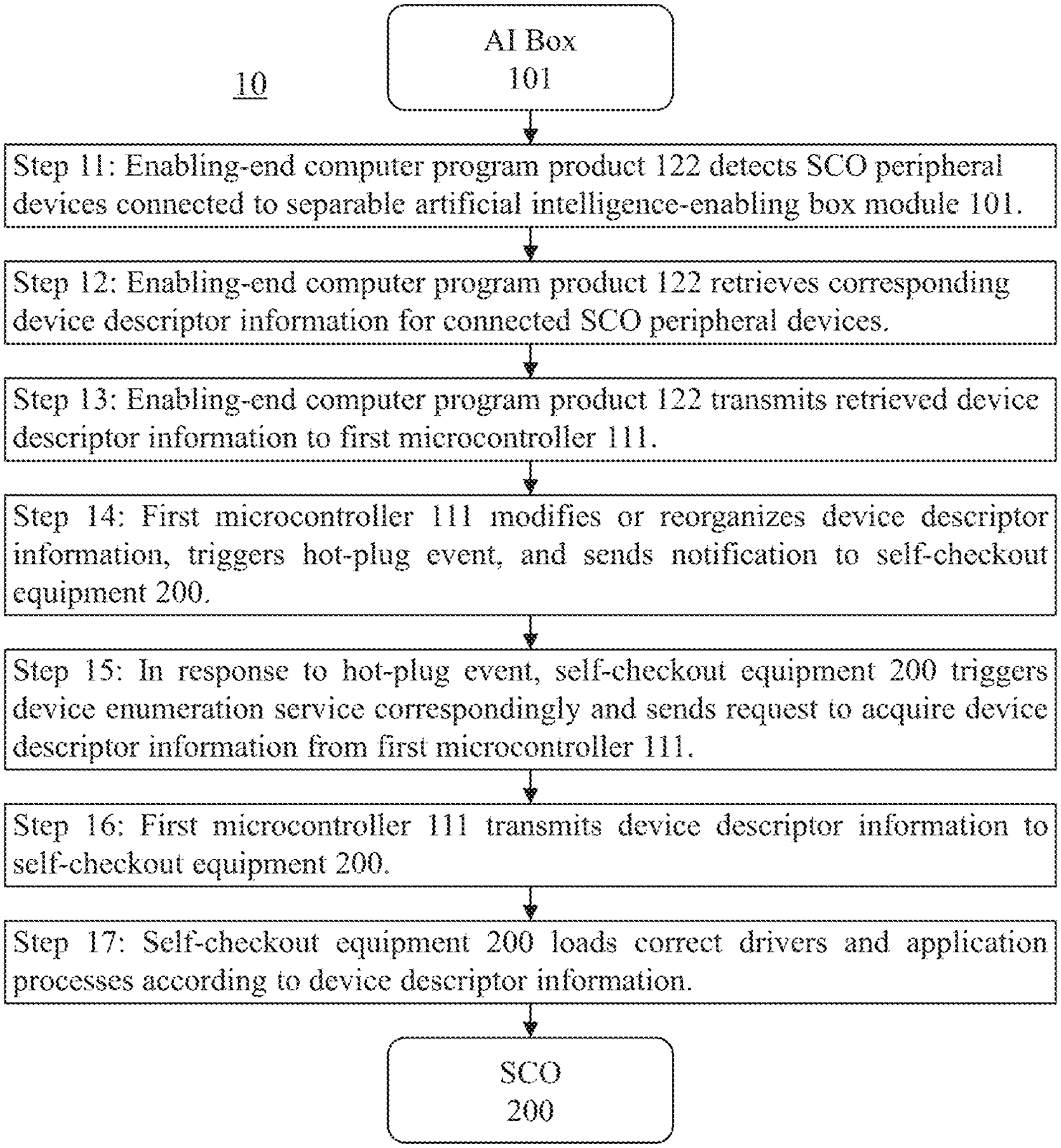
FIG. 6 is a flow chart illustrating implementation steps for the initialization process included in the peripheral device emulation according to the present invention.

FIG. 6 is a flow chart illustrating implementation steps for the initialization process included in the peripheral device emulation according to the present invention. In one embodiment, the initialization process 10 includes the following steps:

- Step 11: The enabling-end computer program product 122 detects the SCO peripheral devices connected to the separable artificial intelligence-enabling box module 101.
- Step 12: The enabling-end computer program product 122 retrieves the corresponding device descriptor information for the connected SCO peripheral devices, such as USB descriptions, required by device drivers.
- Step 13: The enabling-end computer program product 122 transmits the retrieved device descriptor information to the first microcontroller 111.
- Step 14: The first microcontroller 111 modifies or reorganizes the device descriptor information, triggers a hot-plug event, and sends a notification regarding the hot-plug event to the self-checkout equipment 200.
- Step 15: In response to the hot-plug event, the self-checkout equipment 200 triggers a device enumeration service correspondingly and sends a request to acquire the device descriptor information from the first microcontroller 111.
- Step 16: The first microcontroller 111 transmits the device descriptor information to the self-checkout equipment 200.
- Step 17: The self-checkout equipment 200 loads the correct drivers and application processes according to the device descriptor information.

After the initialization process is successfully performed, the self-checkout equipment 200 recognizes the first microcontroller 111 as the actual SCO peripheral devices and continues considering that the original SCO peripheral devices remain connected, does not know that the original SCO peripheral devices are rearranged to physically connect to the separable artificial intelligence-enabling box module 101.

Figure 7:
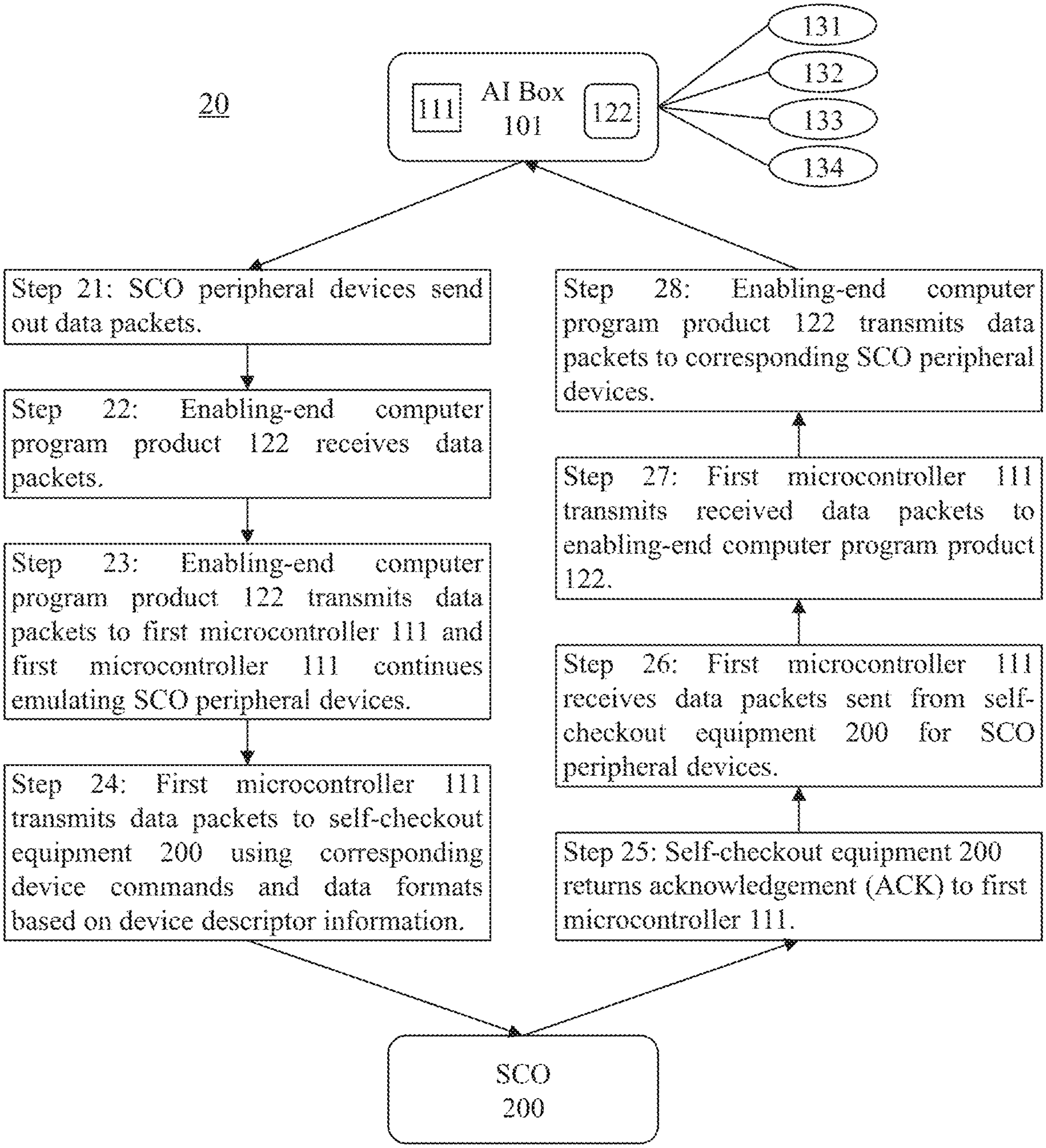
FIG. 7 is a flow chart illustrating implementation steps for the runtime process included in the peripheral device emulation according to the present invention.

FIG. 7 is a flow chart illustrating implementation steps for the runtime process included in the peripheral device emulation according to the present invention. In one embodiment, the runtime process 20 includes the following steps:

- Step 21: The SCO peripheral devices, such as the scanner 131, printer 132, card reader 133, and magnetic stripe reader 134, send out data packets.
- Step 22: The enabling-end computer program product 122 receives the data packets sent from the peripheral devices.
- Step 23: The enabling-end computer program product 122 transmits the data packets to the first microcontroller 111 via a software driver, and the first microcontroller 111 continues emulating the SCO peripheral devices.
- Step 24: The first microcontroller 111 transmits the data packets to the self-checkout equipment 200 using corresponding device commands and data formats based on the device descriptor information.
- Step 25: The self-checkout equipment 200 returns an acknowledgement (ACK) to the first microcontroller 111.
- Step 26: The first microcontroller 111 receives the data packets sent from the self-checkout equipment 200 for the SCO peripheral devices.
- Step 27: The first microcontroller 111 transmits the received data packets to the enabling-end computer program product 122.
- Step 28: The enabling-end computer program product 122 transmits the data packets to the corresponding SCO peripheral devices.

By continuing performing the above steps between the separable artificial intelligence-enabling box module 101 and the self-checkout equipment 200, a data transmitting and receiving loop loop is formed therebetween, thereby realizing the bidirectional data relay.

In this embodiment, although the SCO peripheral devices are actually connected to the separable artificial intelligence-enabling box module 101, by performing the peripheral device emulation by the first microcontroller 111 to emulate the SCO peripheral devices, the self-checkout equipment 200 perceives no changes in the hardware configuration of the SCO peripheral devices and continues recognizing that the SCO peripheral devices are connected to the self-checkout equipment 200 directly and normally.

In this embodiment, even though the SCO peripheral devices are connected to the separable artificial intelligence-enabling box module 101, no external software is installed on the existing SCO machine and the existing SCO machine also perceives no changes in its hardware configuration. Thus, the separable artificial intelligence-enabling box module 101 is still able to capture all data flows sourced from the SCO peripheral devices for subsequent AI interpretation, without modifying the existing software workflow, source code, or hardware configuration of the self-checkout equipment 200, since the self-checkout equipment 200 perceives that there are no changes to its hardware and software configurations.

In this embodiment, for the client end, the client is only required to reconnect the SCO peripheral devices that originally connected to the self-checkout equipment 200 to the separable artificial intelligence-enabling box module 101 and then connect the separable artificial intelligence-enabling box module 101 to the self-checkout equipment 200. With minimal changes, the self-checkout equipment 200 is successfully upgraded in-situ to add AI functionalities, to empower AI capabilities for the original SCO system, without changing either the existing checkout workflow or the original normal operation of the original SCO system.

Figure 8:
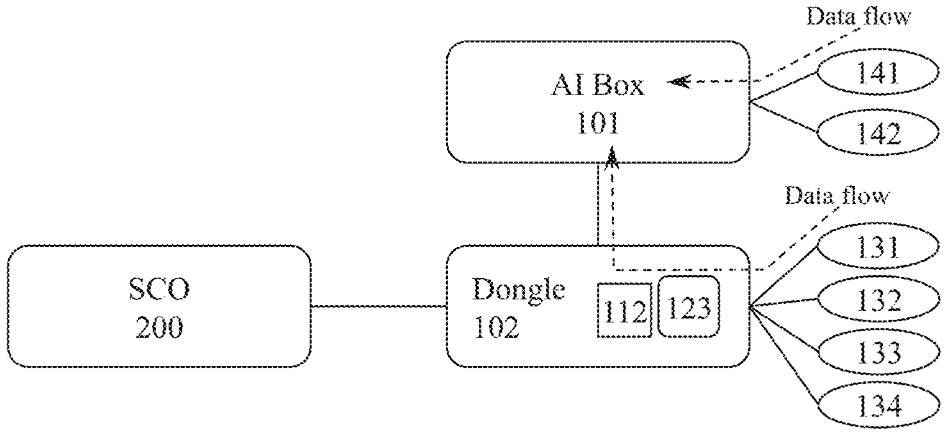
FIG. 8 is a block diagram illustrating the third embodiment included in the present invention.

FIG. 8 is a block diagram illustrating the third embodiment included in the present invention. In the third embodiment, depending on different hardware and software conditions or authorization scopes from the client, the actual conditions offering for configurations may be as follows: it is unacceptable to connect the SCO equipment directly to the AI box or to install external software on the SCO equipment, but it is acceptable to connect the SCO equipment to the AI box via a hardware such as a hub device or a dongle device and to connect all SCO peripheral devices directly to the hardware.

In the third embodiment, the artificial intelligence-enabling kit 100 is selected to include the separable artificial intelligence-enabling box module 101, the data acquisition module 102, and the acquisition-end computer program product 123. The data acquisition module 102 is preferably made in the form of a hub hardware or a dongle hardware, and includes a second microcontroller 112. The data acquisition module 102 connects the SCO peripheral devices, including but not limited to a scanner 131, a printer 132, a card reader 133, and a magnetic stripe reader 134. The separable artificial intelligence-enabling box module 101 connects the AI peripheral devices, including but not limited to an image sensor 141 and a motion sensor 142. The self-checkout equipment 200 is connected to the separable artificial intelligence-enabling box module 101 through the data acquisition module 102.

The the acquisition-end computer program product 123 has core tasks, including signal sniffing, analyzing, and intercepting data flows. In one embodiment, the acquisition-end computer program product 123 has a core program including, for example, but not limited to, a USB protocol analyzer. The acquisition-end computer program product 123 is preferably configured to operate in a form of firmware that is integrated into the second microcontroller 112.

Figure 9:
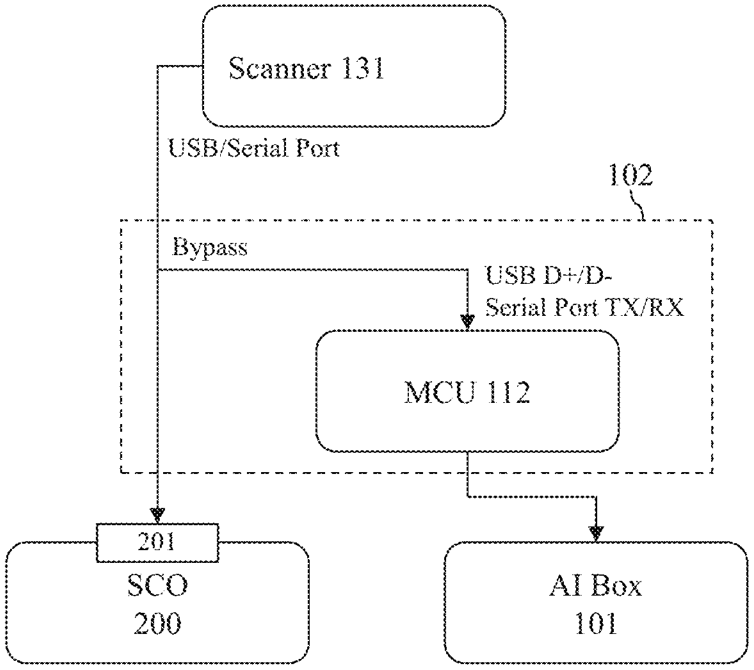
FIG. 9 is a schematic diagram illustrating the circuit layout of the second microcontroller and the principles of operation for the acquisition-end computer program product included in the present invention.

FIG. 9 is a schematic diagram illustrating the circuit layout of the second microcontroller and the principles of operation for the acquisition-end computer program product included in the present invention. In one embodiment, the second microcontroller 112 is preferably a high frequency microcontroller and is configured in the data acquisition module 102 in a bypass circuit layout relative to the main circuit formed between the communication interface 201 and the SCO peripheral devices such as the scanner 131 configured in the self-checkout equipment 200, thereby performing the signal sniffing and analyzing on the signals passing through the main circuit and extracting the required data packets therefrom.

In one embodiment, signals from peripheral devices such as the scanner 131 enter the communication interface 201, and it is assumed that the communication interface is the USB communication interface. Then, the second microcontroller 112 is configured to analyze the USB D+/D− signals under the control of the acquisition-end computer program product 123 and to transmit the analyzed signals to the separable artificial intelligence-enabling box module 101. When the communication interface is the serial communication interface, the second microcontroller 112 is configured to analyze the serial port TX/RX signals under the control of the acquisition-end computer program product 123 and to transmit the analyzed signals to the separable artificial intelligence-enabling box module 101.

In this embodiment, since the data acquisition module 102 is configured to perform the bypass signal analysis to capture data flows, the existing SCO machine perceives no changes in its hardware configuration. Furthermore, since no external software is installed on the existing SCO machine, the self-checkout equipment 200 perceives no changes in its software or hardware configurations. Thus, without modifying the existing software workflow, source code, or hardware configuration of the self-checkout equipment 200, the separable artificial intelligence-enabling box module 101 is still able to capture all data flows sourced from the SCO peripheral devices for subsequent AI applications.

In this embodiment, it is preferable that the separable artificial intelligence-enabling box module 101 can be any third-party products provided from suppliers or vendors different from those of the data acquisition module 102 and the self-checkout equipment 200, which has great compatibility with any brand.

In this embodiment, for the client end, the client is only required to reconnect the SCO peripheral devices that originally connected to the self-checkout equipment 200 to the data acquisition module 102 and then connect the data acquisition module 102 to both the separable artificial intelligence-enabling box module 101 and the self-checkout equipment 200. With minimal changes, the self-checkout equipment 200 is successfully upgraded in-situ to add AI functionalities, to empower AI capabilities for the original SCO system, without changing either the existing checkout workflow or the original normal operation of the original SCO system.

Furthermore, consumers do not need to change their established checkout habits, the functionalities of the original SCO system remain operating normally without any change and there is no need to install any external software on the original SCO machine. The SCO machine still receives data from SCO peripheral devices and carries out transaction operations as usual, and consumers carry out self-service checkout according to their previous habits, while the separable artificial intelligence-enabling box module 101 has already captured all required raw data at the same time.

The present invention provides a suite of AI upgrade integral solution including a separable artificial intelligence-enabling box module, a data acquisition module, a checkout-end computer program product, an enabling-end computer program product, and an acquisition-end computer program product for the existing SCO equipment lacking AI capabilities, so that the conventional SCO equipment lacking AI capabilities and computing power can be easily upgraded and transformed into an intelligent self-checkout equipment with multiple AI functionalities.

The present invention is provided with a modularized hardware and software design that can be flexibly applied to different types of SCO equipment. Regardless of whether an existing SCO machine that is a semi-open system that accepts the installation of external software or a closed system that accepts only external hardware, the present invention is capable of being easily deployed therein, and significantly reduces the difficulty of integrating AI technology into the existing SCO system.

The solution provided by the present invention is configured to add AI capabilities, including but not limited to interpretation, detection, and analysis, to the current SCO environment, so as to enable intelligent functionality, including but not limited to anti-miss swipe and anti-skimming therefor, but to still reserve the original operation for the original SCO system and SCO peripheral devices, such as barcode scanners, card readers, printers, etc., so that consumers do not need to change the original checkout process that they are already familiar with and accustomed to.

The present invention provides a technical framework which offers for the existing SCO machine with an AI enabling scheme based on a suite of quick AI enabling kit to realize various AI capabilities, by simply connecting with an external separate AI enabling box module, without changing the original software and hardware configurations thereof, which AI enabling scheme ensures the stability and reduces the risk and uncertainty that may occur during the process of deploying the AI technology for the original SCO system.

The AI upgrade scheme provided by the present invention does not require the current SCO system to modify the existing application programs or operating system source code, nor does it require the current SCO system to rewrite the original driver logic. By combining three independent components, including the filter drivers, the simulated firmware, and the bypass capture modules, the present invention is sufficient to intercept, capture, and process all required data while preserving the original operation for the original SCO system functions.

There are further embodiments provided as follows.

Embodiment 1: An artificial intelligence-enabling kit, attached to a self-checkout equipment, includes: a separable artificial intelligence-enabling box module including a first microcontroller and configured to be connected with the self-checkout equipment; a checkout-end computer program product selectively configured on the self-checkout equipment; and an enabling-end computer program product selectively configured on the separable artificial intelligence-enabling box module and configured to control the first microcontroller to perform a peripheral device emulation.

Embodiment 2: The artificial intelligence-enabling kit as described in Embodiment 1, further includes one of: a data acquisition module selectively configured between the self-checkout equipment and the separable artificial intelligence-enabling box module and including a second microcontroller configured in a circuit layout of a bypass configuration to connect with the self-checkout equipment; and an acquisition-end computer program product configured in the data acquisition module to control the second microcontroller to perform a bypass signal analyzing, to acquire data generated by the peripheral device and transmit it to the separable artificial intelligence-enabling box module.

Embodiment 3: The artificial intelligence-enabling kit as described in Embodiment 1, the separable artificial intelligence-enabling box module further includes: a processor configured to execute an artificial intelligence algorithm, wherein the separable artificial intelligence-enabling box module is configured to enable an artificial intelligence capability for the self-checkout equipment.

Embodiment 4: The artificial intelligence-enabling kit as described in Embodiment 2, further includes one of: a plurality of self-checkout peripheral devices including one of a scanner, a printer, a card reader, and a magnetic stripe reader; and a plurality of artificial intelligence peripheral devices including one of an image sensor and a motion sensor.

Embodiment 5: The artificial intelligence-enabling kit as described in Embodiment 4, the checkout-end computer program product is configured to include a filter driver and to insert the filter driver between a communication interface functional driver and a bus driver included in the self-checkout equipment, to monitor and intercept data flow passing through a communication interface included in the self-checkout equipment by the filter driver, after a first self-checkout peripheral device included in the plurality of self-checkout peripheral devices is inserted into the self-checkout equipment, so as to acquire raw data from the first self-checkout peripheral device.

Embodiment 6: The artificial intelligence-enabling kit as described in Embodiment 4, the enabling-end computer program product is configured to control the first microcontroller to perform the peripheral device emulation, to emulate a first self-checkout peripheral device included in the plurality of self-checkout peripheral devices via the first microcontroller for the self-checkout equipment to perform a corresponding hardware configuration, after the first self-checkout peripheral device is inserted into the separable artificial intelligence-enabling box module, so as to acquire raw data from the first self-checkout peripheral device.

Embodiment 7: The artificial intelligence-enabling kit as described in Embodiment 6, the peripheral device emulation includes an initialization process and a runtime process, the initialization process including one of: acquiring a device descriptor information for the first self-checkout peripheral device; triggering a hot-plug event on the separable artificial intelligence-enabling box module based on the device descriptor information; sending a notification to the self-checkout equipment to notify the hot-plug event; in response to an acknowledgement of the notification, the self-checkout equipment configured to send a request to acquire the device descriptor information from the separable artificial intelligence-enabling box module; and based on the device descriptor information, the self-checkout equipment configured to trigger a device enumeration service.

Embodiment 8: The artificial intelligence-enabling kit as described in Embodiment 7, the runtime process includes one of: receiving a first data packet generated by the first self-checkout peripheral device; transmitting the first data packet to the first microcontroller by a software driver; controlling the first microcontroller to transmit the first data packet to the self-checkout equipment, by using a corresponding device command and data format based on the device descriptor information; receiving a second data packet sent from the self-checkout equipment for the first self-checkout peripheral device by the first microcontroller; transmitting the second data packet by the first microcontroller to the enabling-end computer program product; and transmitting the second data packet to the first self-checkout peripheral device by the enabling-end computer program product.

Embodiment 9: The artificial intelligence-enabling kit as described in Embodiment 4, the second microcontroller is configured in the data acquisition module in the circuit layout of the bypass configuration with respect to a main circuit between a communication interface and a first self-checkout peripheral device included in the plurality of self-checkout peripheral devices included in the self-checkout equipment.

Embodiment 10: The artificial intelligence-enabling kit as described in Embodiment 9, the acquisition-end computer program product is configured to include a protocol analyzer, to control the second microcontroller to perform the bypass signal analyzing to analyze data flow passing through the communication interface, after the first self-checkout peripheral device included in the plurality of self-checkout peripheral devices is inserted into the data acquisition module, so as to acquire raw data associated to the first self-checkout peripheral device therefrom.

While the disclosure has been described in terms of what are presently considered to be the most practical and preferred embodiments, it is to be understood that the disclosure need not be limited to the disclosed embodiments. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present disclosure which is defined by the appended claims.

What is claimed is:

1. An artificial intelligence-enabling kit, attached to a self-checkout equipment, comprising:

a separable artificial intelligence-enabling box module comprising a first microcontroller and configured to be connected with the self-checkout equipment;

a checkout-end computer program product selectively configured on the self-checkout equipment;

an enabling-end computer program product selectively configured on the separable artificial intelligence-enabling box module and configured to control the first microcontroller to perform a peripheral device emulation; and one of:

a data acquisition module selectively configured between the self-checkout equipment and the separable artificial intelligence-enabling box module and comprising a second microcontroller configured in a circuit layout of a bypass configuration to connect with the self-checkout equipment; and an acquisition-end computer program product configured in the data acquisition module to control the second microcontroller to perform a bypass signal analyzing, to acquire data generated by the peripheral device and transmit the acquired data to the separable artificial intelligence-enabling box module.

2. The artificial intelligence-enabling kit as claimed in claim 1, wherein the separable artificial intelligence-enabling box module further comprises:

a processor configured to execute an artificial intelligence algorithm, wherein the separable artificial intelligence-enabling box module is configured to enable an artificial intelligence capability for the self-checkout equipment.

3. The artificial intelligence-enabling kit as claimed in claim 1, further comprising one of:

a plurality of self-checkout peripheral devices comprising one of a scanner, a printer, a card reader, and a magnetic stripe reader; and a plurality of artificial intelligence peripheral devices comprising one of an image sensor and a motion sensor.

4. The artificial intelligence-enabling kit as claimed in claim 3, wherein the checkout-end computer program product is configured to comprise a filter driver and to insert the filter driver between a communication interface functional driver and a bus driver comprised in the self-checkout equipment, to monitor and intercept data flow passing through a communication interface comprised in the self-checkout equipment by the filter driver, after a first self-checkout peripheral device comprised in the plurality of self-checkout peripheral devices is inserted into the self-checkout equipment, so as to acquire raw data from the first self-checkout peripheral device.

5. The artificial intelligence-enabling kit as claimed in claim 3, wherein the enabling-end computer program product is configured to control the first microcontroller to perform the peripheral device emulation, to emulate a first self-checkout peripheral device comprised in the plurality of self-checkout peripheral devices via the first microcontroller for the self-checkout equipment to perform a corresponding hardware configuration, after the first self-checkout peripheral device is inserted into the separable artificial intelligence-enabling box module, so as to acquire raw data from the first self-checkout peripheral device.

6. The artificial intelligence-enabling kit as claimed in claim 5, wherein the peripheral device emulation comprises an initialization process and a runtime process, the initialization process comprising one of:

acquiring a device descriptor information for the first self-checkout peripheral device;

triggering a hot-plug event on the separable artificial intelligence-enabling box module based on the device descriptor information;

sending a notification to the self-checkout equipment to notify the hot-plug event;

in response to an acknowledgement of the notification, the self-checkout equipment configured to send a request to acquire the device descriptor information from the separable artificial intelligence-enabling box module; and based on the device descriptor information, the self-checkout equipment configured to trigger a device enumeration service.

7. The artificial intelligence-enabling kit as claimed in claim 6, wherein the runtime process comprises one of:

receiving a first data packet generated by the first self-checkout peripheral device;

transmitting the first data packet to the first microcontroller by a software driver;

controlling the first microcontroller to transmit the first data packet to the self-checkout equipment, by using a corresponding device command and data format based on the device descriptor information;

receiving a second data packet sent from the self-checkout equipment for the first self-checkout peripheral device by the first microcontroller;

transmitting the second data packet by the first microcontroller to the enabling-end computer program product; and transmitting the second data packet to the first self-checkout peripheral device by the enabling-end computer program product.

8. The artificial intelligence-enabling kit as claimed in claim 3, wherein the second microcontroller is configured in the data acquisition module in the circuit layout of the bypass configuration with respect to a main circuit between a communication interface and a first self-checkout peripheral device comprised in the plurality of self-checkout peripheral devices comprised in the self-checkout equipment.

9. The artificial intelligence-enabling kit as claimed in claim 8, wherein the acquisition-end computer program product is configured to comprise a protocol analyzer, to control the second microcontroller to perform the bypass signal analyzing to analyze data flow passing through the communication interface, after the first self-checkout peripheral device comprised in the plurality of self-checkout peripheral devices is inserted into the data acquisition module, so as to acquire raw data associated to the first self-checkout peripheral device therefrom.

* * * * *